June 3, 1969

J. FABRI ET AL 3,447,740

SUPERSONIC COMPRESSOR

Filed July 13, 1967

Sheet _1_ of 3

INVENTORS
JEAN FABRI
JEAN MARIE EUGENE FRIBERG
PIERRE HENRI JEAN MAGINOT
JEAN MARIE MERIGOUX
RAYMOND SIESTRUNCK

BY Baldwin Wight Diller & Brown
ATTORNEYS

United States Patent Office 3,447,740
Patented June 3, 1969

3,447,740
SUPERSONIC COMPRESSOR
Jean Fabri, Ville-d'Avray, Jean Marie Eugene Friberg, Bourg-la-Reine, Pierre Henri Jean Maginot, Paris, Jean Marie Merigoux, Palaiseau, and Raymond Siestrunck, Le Rosier, France, assignors to Societe Anonyme, Societe Alsacienne de Constructions Atomiques de Telecommunications et d'Electronique Alcatel, Paris, France, a corporation of France
Filed July 13, 1967, Ser. No. 653,076
Claims priority, application France, July 16, 1966, 69,660
Int. Cl. F04d 25/16, 19/00, 23/00
U.S. Cl. 230—119   7 Claims

ABSTRACT OF THE DISCLOSURE

The invention provides a compressor arranged in such a manner that it combines in a movement resulting in a conical flow or flowing sheet, on the one hand centrifugal velocity motion transmitted in a centrifuge compressor to a fluid having a transversal motion, and on the other hand, the (axial) velocity motion imparted to the fluid in an axial compressor.

---

The object of the invention is a supersonic axial compressor with axial flow ensuring a relatively high output at a high compression ratio avoiding the respective drawbacks of the axial compressor and centrifugal compressor.

It is known that the centrifugal compressor, in spite of enabling a high compression ratio to be obtained, has the drawback of only accepting limited mass outputs. As the fluid speed can only be converted into pressure by causing the gas to emerge in a volute the volume of the apparatus is increased accordingly. Finally, the existance of substantial friction surfaces leads to great loss of power and reduces efficiency. As a result an axial type compressor is preferable when a compressor providing a high ratio of output and efficiency is required.

The conventional axial compressor enables a much larger output to be obtained and also provides very favorable results from the standpoint of efficiency; yet the compression ratio by stage, at a subsonic velocity of fluid flow, remains relatively low, whereby a large number of stages becomes necessary to obtain a satisfactory aggregate compression ratio. Numerous mechanical complications result, which lead to an increase in cost and also to mechanical losses, with the result that the advantages which might be expected to result from favorable jet efficiency are not obtained.

It has already been suggested that the compression ratio of axial machines could be improved by increasing the peripheral velocity and by providing them with a transonic or even supersonic interior aerodynamic form. Two very different solutions have been suggested to increase the absolute speed of the fluid in the channel between the blades without modifying the output velocity thereof (that is the axial component of the speed of the fluid):

The first consists in imparting a large degree of deflection to the blades while retaining their thin profile, thus obtaining an increase in driving speed (that is, the radial component of the absolute speed), but the absolute fluid speed is then very slanted with respect to the axis, so that it has then to be straightened out i.e. rectified to recover the pressure in an axial direction. In this solution therefore, the fluid twice undergoes loss, by impacts and by friction, the first time when the fluid speed is sloped, the second when it is straightened at the outlet of the movable wheel;

The second solution consists in increasing the speed of the fluid by making the cross-section of the channel between the blades narrower at the escape edge than at the inlet; in this case it is necessary to use thicker blades at the trailing edge, which thus results in heavy losses by friction.

It is also known that in both these solutions a shock wave is produced whose position determines and "congeals" i.e. sets or maintains at a fixed valve, the fluid flow between two successive blades, at the time when the fluid slows down and passes from the supersonic to the subsonic speed. It has been established that this shock wave, and the angle it forms with the absolute speed of the fluid, are uncertain; if the shock wave is, as a rule, set up at the input to the movable blades it is, however, established that it often forms at variable positions within the channel between the blades, and that it finally "congeals" the flow of the mass at very different values from the expected one. It is therefore easy to imagine the difficulties inherent in the construction of supersonic compressors and the lack of trustworthyness which adds to the other drawbacks and difficulties of such a construction.

The present invention has for its object to palliate the aforesaid drawbacks of the known compressors.

The first object of the invention is to provide a high ratio mode of compression of a fluid moving at supersonic speed, which consists essentially in the use of relatively thin, slightly deflected blades, giving the fluid the form of a conical jet whilst retaining a generally axial direction of flow. In other words, it may be said that the invention relates to a compressor arranged in such a manner that it combines in a movement resulting in a conical flow or flowing sheet, on the one hand centrifugal velocity motion transmitted in a centrifuge compressor to a fluid having a transversal motion, and on the other hand, the (axial) velocity motion imparted to the fluid in an axial compressor.

A compressor for the embodiment of this process can essentially be constituted about a driving motor and coaxial therewith, of an inlet splaying out into a frustum of a cone and a cap, the top portion of which is positioned on the axis of the driving shaft and whose walls are disposed at a certain distance from those of the frustoconical splay; a distributor with fixed blades mounted in the channel formed between the splay and the cap; a movable wheel with thin deflecting blades mounted in the said channel and driven in rotation by the driving shaft; and means mounted downstream of the driving wheel to convert the velocity of the fluid into pressure, said channel formed between the splay and the cap being continually converging from upstream to downstream at the level of said movable wheel. The means for converting the remaining velocity into pressure can, for instance, be a diffusor or a diffusor followed by a volute or a straightener.

The walls of the frustoconical splay and the walls of the cap can be parallel. Said walls can also provide therebetween a space of conical shape, i.e. divergent downstream of the movable wheel. In this space fixed blades can be provided to straighten fluid flow.

To construct a two-stages or multi-stages compressor, one or more movable wheels with blades each of which, with the exception of the last, is followed by a rectifier, are mounted upstream of the means converting the velocity into pressure. In other words there can be provided into the frusto-conical portion mentioned above, a succession of assemblies each of which comprises a wheel followed by a straightener acting as a distributor for the following stage. It is thus possible to introduce at the level of each stage a flux, for instance a recycling flux oriented by the distributor.

In the case of two, or multiple, stage compression and double or multiple flux, the above compressor is provided at the outlet of the first movable wheel with a flow rectifying device with blades rigidly fixed to the wall of the frusto-conical splay, with at least one second fluid inlet supplied from a forward compression stage or from another source, the wall of this inlet splaying out at a certain distance from the wall of the cap extended from the forward of preceding stage; a second movable wheel with thin, deflecting blades driven in rotation by the driving shaft and extending between the outer wall of the cap and the inner wall of the second inlet; a second fixed distributor located in the second inlet downstream of the second movable wheel, whereby this second distributor is at the level of the rectifying device, and the fluid leaving the second movable wheel is directed either upwardly to a diffuser or an outlet volute or to a rectifier for admission to another compression stage.

In a compressor according to the invention the fluid moves in a conical flow at a relative supersonic velocity; at the input of the rotor, the increase in energy is obtained, firstly, owing to the increase in the driving speed thereof caused by the increase of its radius of rotation during its flow along a thin, movable blade whose longitudinal edges are sloped with respect to the axis of rotation, and secondly, owing to a moderate deflection produced by the shape of the blades, the said fluid being injected into the movable blading at subsonic absolute speed by the distributor, and being again at a subsonic speed during its passage through the diffusor.

It has been established that the arrangement according to the invention enables a substantially constant output velocity to be maintained throughout the length of the machine, thus facilitating recovery of the semi kinetic energy of the jet. The arrangement is particularly favorable in mountings with several stages. The use of a volute is especially suitable in stationary machines as the amount of space they take up is reduced and they can therefore be placed overhanging the driving shaft.

Again, the invention permits supersonic compressors to be constructed which provide a predetermined output, as the blading is calculated so that the sonic neck blocking the output only appears for the desired nominal output.

Examples of carrying out the compressor according to the invention are described hereinafter with reference to the appended drawings in which.

Figure 1:
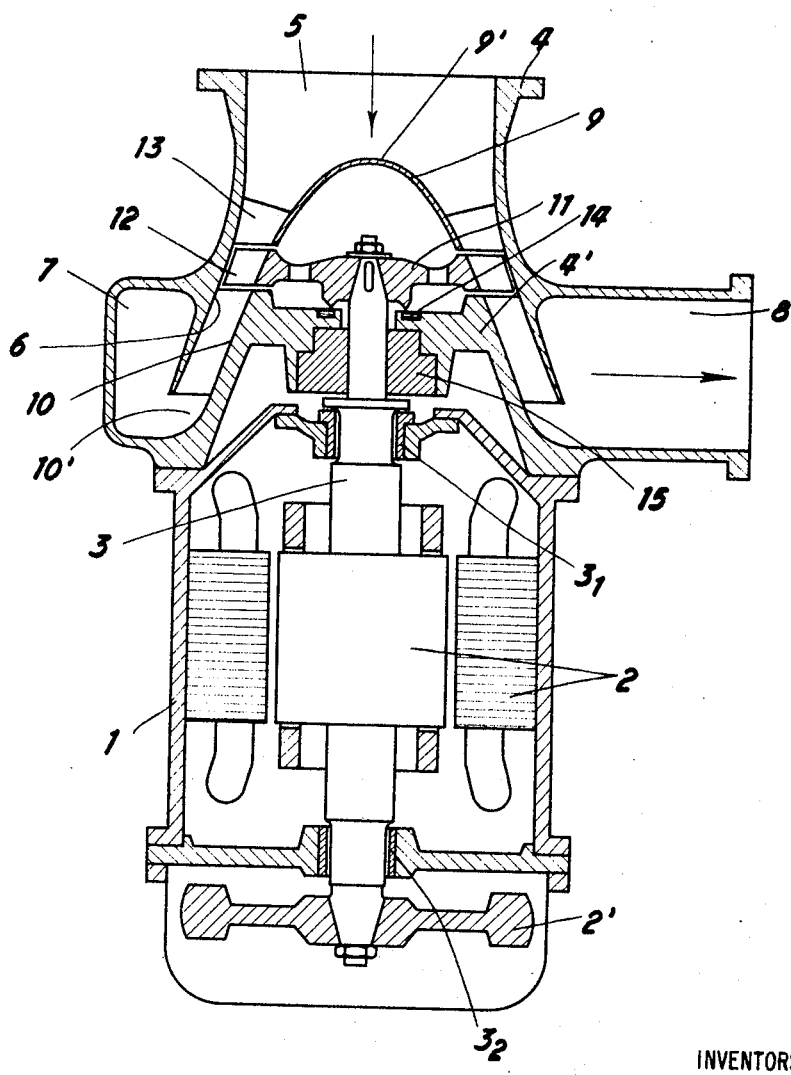
FIG. 1 is an axial vertical cross section of a single stage, single flux compressor.

In the example shown in FIGURE 1 the single stage compressor comprises, according to the invention a housing 1, containing an electric motor 2 having a vertical shaft 3 with a flywheel 2', with an upper thrust bearing $3_1$ and lower bearing $3_2$. Shaft 3 extends outside the housing 1 on which is fixedly mounted an assembly 4 consisting of a fluid inlet 5 coaxial with the axis of shaft 3 and which splays out downwardly into a substantially frustoconical surface 6, and of a volute 7, whereby the splay 6 is prolonged to a certain level above the bottom of the volute 7. The volute 7 comprises an outlet 8 for the compressed gas. Coaxial with the axis of shaft 3 is disposed a cap 9 with its rounded summit 9' on the said axis, at a certain distance, preferably small, downstream of the start of the splay 6. The surface 10 of the cap 9 extends downstream, parallel to the inner surface of the splay 6 and is connected by a progressive fillet 10' to the bottom of the volute 7. Near the upper extension of shaft 3, is secured a movable wheel 11 with thin blades 12 the longitudinal edges of which are sloped with respect to the axis of shaft 3 and are shaped to impart a moderate deflection to the fluid. Upstream of the movable wheel 11, a distributor 13 with blades is mounted stationary at the inlet of the channel provided between the splay 6 and surface of the cap 9. A tightening obturator 14 is shown between the hub of the mobile wheel 11 and the sealing 15 provided between the shaft and the inner part 4' of the assembly 4.

Figure 2:
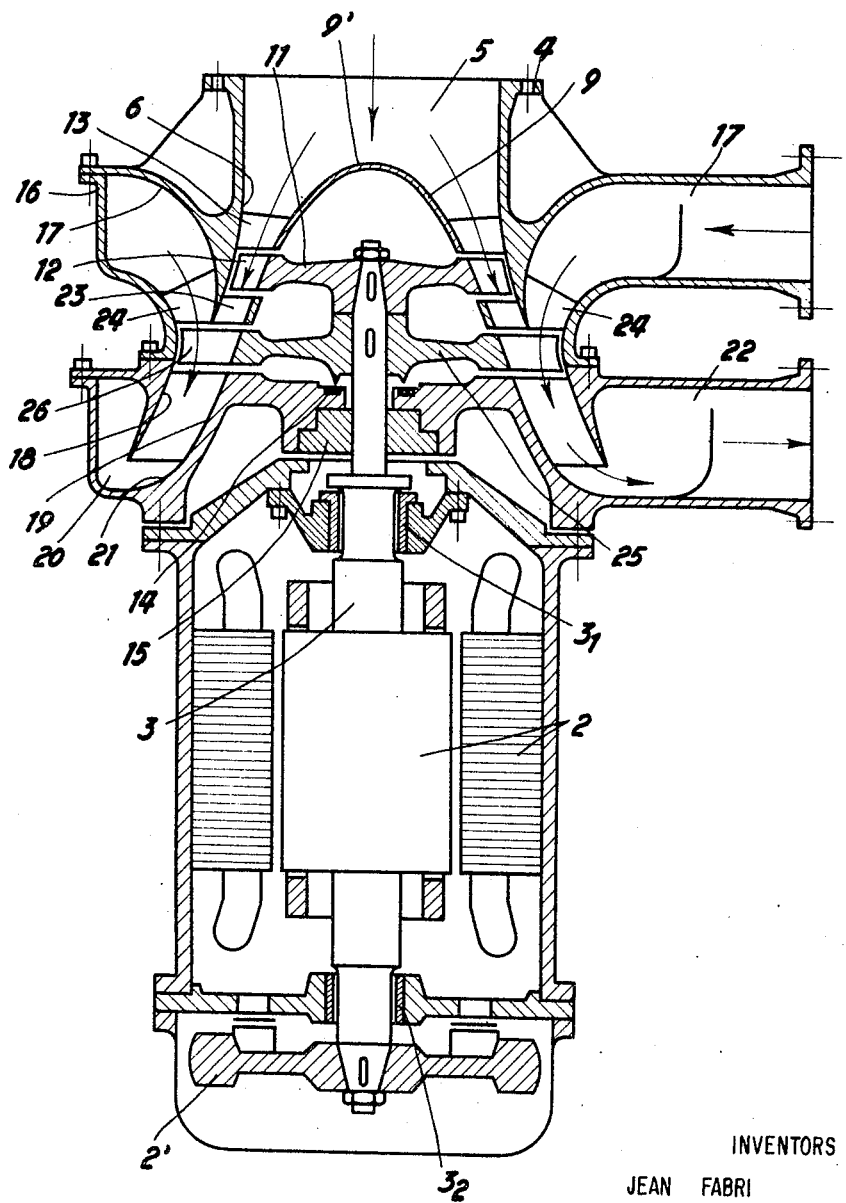
FIG. 2 is a similar view of a two-stage, double flux compressor.

The compressor shown in FIGURE 2 comprises two stages. There is seen the housing 1, motor 2 and shaft 3 extending upwardly and outwardly; the first stage consists of assembly 4 with the fluid inlet nozzle 5 and its frusto-conical splay 6, as well as the cap 9, the stationary distributor 13 and movable wheel 11. The second stage comprises an assembly 16 which is rigidly secured exteriorly to assembly 4 and which comprises an inlet 17, used here for recycling a secondary fluid flux, extended towards the base by a frusto-conical splay 18, the inner surface of which extends along wall 19 which prolongs the cap portion 9 of the first stage. This wall 19 is connected by a progressive fillet 21 to the bottom of volute 20. The treated fluid issues from the delivery 22. On the portion forming the lower end of splay 6 of the first stage is fixedly mounted a straightener, i.e. rectifier 23 for the fluid which has flowed along movable blades 12. A stationary distributor 24 is mounted between the lower end of the outer wall of splay 6 and the inner wall of inlet 17. Downstream of the rectifier 23 and distributor 24 a movable wheel 25 with blades 26 is rotatable, driven in rotation by driving shaft 3. The blades 26 are sloped with respect to the axis of shaft 3 and are shaped so as to impart moderate deflection to the fluid. The fixed blades of rectifier 23 and distributor 24 are disposed at a short distance from blades 26 of wheel 25 (in the range of 1 mm. for instance).

It is seen that the operation of this compressor is the same as that of the compressor of FIGURE 1; it is also seen that the fluid entering through the second intake 17 can be a different fluid from that drawn in through the first inlet and compatible therewith, whereby both fluids can be mixed by compressing them to the desired ratio.

Figure 3:
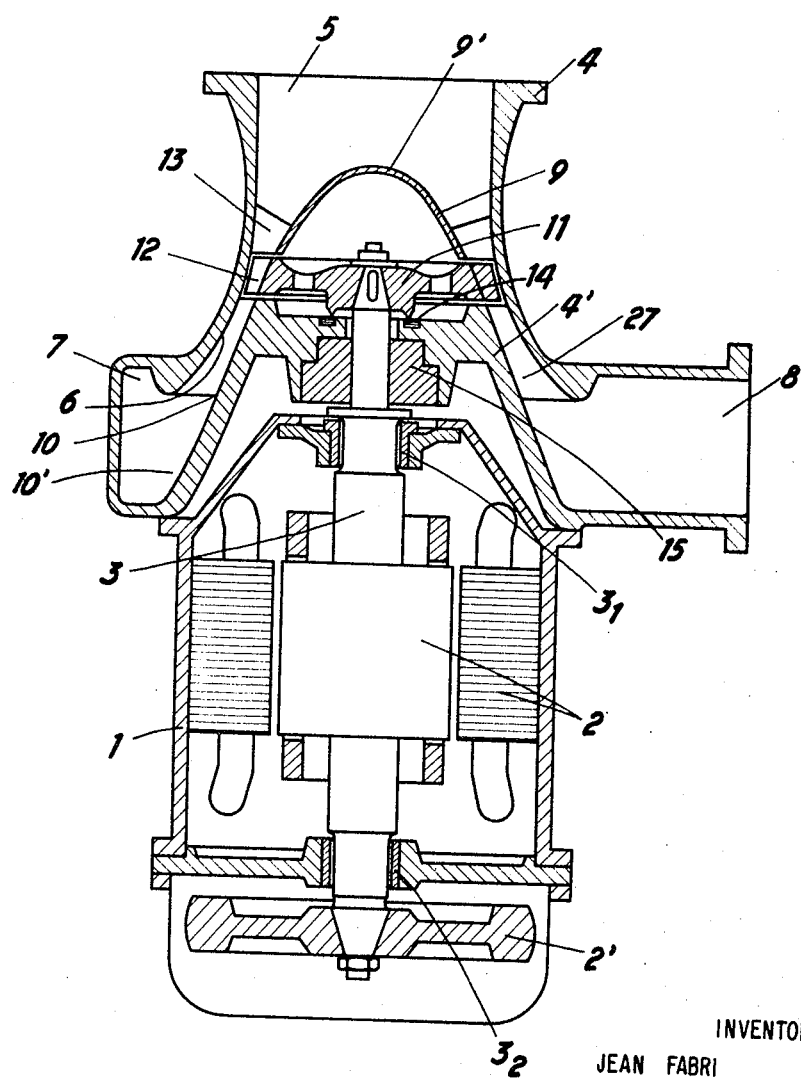
FIG. 3 is an axial vertical cross section of an alternative single stage compressor, with single flux.

The compressor shown at FIGURE 3 provides the general features of example represented on FIGURE 1. Said compressor comprises a housing 1 containing an electric motor 2 having a vertical shaft 3 with flywheel 2', with an upper thrust-bearing $3_1$ and lower bearing $3_2$. Shaft 3 extends outside the housing on which is fixedly mounted an assembly 4 consisting of a fluid inlet nozzle 5 and a volute 7; the fluid inlet nozzle 5 is coaxial with the axis of the shaft and splays out progressively downwardly into a substantially frustoconical surface 6. The volute 7 comprises an outlet 8 for the compressed fluid. Coaxial with the axis of shaft 3 is disposed a spherical cap 9 whose summit 9' is substantially on the same level as the start of the fluid inlet splay whilst the spherical cap 9 extends downstream by a substantially frustoconical portion 10 opposite the inner surface of the frustoconical splay 6 and is connected by a progressive fillet 10' to the bottom of the volute 7. The annular space between the splay 6 and the frustoconical portion 10 forms the fluid flow channel and successively forms from upstream to downstream a converging space followed by a diverging space downstream of the movable wheel. Volute 7 which recovers the fluid at a low velocity in the order of 0.1 Mach, ends in a large diameter outlet channel 8 substantially perpendicular to the axis of the machine. Adjacent to the end of the upper extension of the shaft 3 is secured a movable wheel 11 with thin blades 12 sloped with respect to the axis of shaft 3 to obtain a relative supersonic fluid speed in the wheel. The angle of slope of the blades 12 at the inlet is in the range of 60° and lessens slightly at the outlet to impart moderate deflection to the fluid. Upstream of the movable wheel 11 a distributor device 13 with blades is mounted stationary at the inlet of the convergent channel provided between the splay 6 and the surface of the cap 9. The slope of the blades of the distributor and the direction of this slope depend on the desired deflection. It was selected at an angle of 45° in the direction of the driving velocity. The distance between the blades of distributor 13 and the blades 12 of the movable wheel 11 is selected as being very slight, compatible with the acceptable play, in the range of 1 mm. for instance. A tightening obturator 14 is shown between the hub of the mobile wheel 11 and the sealing 15 provided between the shaft and the inert part 4' of the assembly 4. The divergent portion of the channel in which a shock wave is produced constitutes the diffusor. It comprises thin fixed blades 27 determining divergent channels, the blades contribute to increase the slope of the fluid towards the axis to bring it nearer to the direction of the volute.

There has been described hereinabove a method of compression and machines called compressors receiving energy and converting it into fluid compression. Inversely, fluid under pressure can be injected into the machine and the energy of this fluid recovered in mechanical form, thus constituting an axial supersonic turbine with conical jet.

What we claim is:

1. In a compressor for compressing with conical flow and high output at a high compression ratio a fluid moving at the input of the compressor at a relative supersonic velocity, a symmetrical inlet for the aspiration of the fluid splaying progressively downstream into a frustoconical surface having the same axis as the inlet, a shaft coaxial with said axis, means to drive said shaft in rotation, a cap symmetrical with respect to said axis and having its rounded summit on said axis, said cap surrounding said shaft with its outer surface spaced from the inner surface of the frustoconical surface, a rotatable wheel secured to the said shaft and having peripheral thin blades the longitudinal leading and trailing edges of which are sloped with respect to the axis of the shaft and the adjacent blades forming a converging flow passage in a downstream direction therebetween, the channel provided between the splay and the cap being continually converging from upstream to downstream extending over said rotatable wheel, said peripheral thin blades being situated in said channel, stationary blades mounted upstream of the rotatable wheel in said channel, means mounted downstream of the rotatable wheel to transform into pressure the speed of the fluid, and an outlet for the compressed fluid.

2. A compressor according to claim 1, in which said means mounted downstream of said rotatable wheel comprises a diffusor.

3. A compressor according to claim 1, in which said means mounted downstream of said rotatable wheel comprises a diffusor and a volute.

4. A compressor according to claim 1, in which the space between the splay and the cap is a converging channel upstream of said rotatable wheel, a neck downstream of said wheel and a divering channel downstream of said neck.

5. A compressor according to claim 1 in which said means mounted downstream of said rotatable wheel comprises a diffusor and a straightener.

6. A compressor according to claim 2, in which said diffusor comprises a channel portion between the outer portion of said frustoconical surface and the inner portion of said cap, said channel portion diverging from upstream to downstream at the level of the diffusor.

7. A multistage compressor with conical flow comprising a symmetrical inlet for the aspiration of the fluid splaying progressively downstream into a succession of axially spaced frustoconical surfaces of progressively increasing sections having the same axis as the inlet, a shaft coaxial with said axis, means for driving said shaft in rotation, a cap symmetrical with respect to said axis and having its rounded summit on said axis, said cap surrounding said shaft with its outer surface spaced from the inner surface of the one of said frustoconical surfaces which is most adjacent to said inlet, a series of rotatable wheels secured respectively at different levels on the said shaft and having thin peripheral blades the longitudinal leading and trailing edges of which are sloped with respect to said axis of the shaft and the adjacent blades forming a converging flow passage in a downstream direction therebetween and are situated in the respective spaces between the surface of the cap and each of said successive frustoconical surfaces, stationary thin sloped blades situated downstream of each of said rotatable wheels between each of the successive frustoconical surfaces and the surface of the cap, means to introduce fluid under pressure at the level of the successive rotatable wheels, downstream of the last of said rotatable wheels, means mounted downstream of the rotatable wheels to transform into pressure the speed of the fluid issuing from said stationary blades, and an outlet for the compressed fluid.

References Cited

UNITED STATES PATENTS

| 2,628,768 | 2/1953 | Kantrowitz. |
| 3,010,642 | 11/1961 | Dickmann et al. |

FOREIGN PATENTS

| 972,751 | 9/1950 | France. |
| 978,972 | 12/1950 | France. |
| 586,566 | 3/1947 | Great Britain. |
| 594,307 | 11/1947 | Great Britain. |

HENRY F. RADUAZO, *Primary Examiner.*

U.S. Cl. X.R.

230—120, 122